March 4, 1969  G. E. CORMIER ET AL  3,431,473

ENCAPSULATED CAPACITOR

Filed April 4, 1967

United States Patent Office 3,431,473
Patented Mar. 4, 1969

3,431,473
ENCAPSULATED CAPACITOR
George E. Cormier, Barre, Vt., and Paul H. Netherwood, Williamstown, Mass., assignors to Sprague Electric Company, North Adams, Mass., a corporation of Massachusetts
Filed Apr. 4, 1967, Ser. No. 628,450
U.S. Cl. 317—258
Int. Cl. H01g 1/02, 1/10
6 Claims

ABSTRACT OF THE DISCLOSURE

Fibrous material, impregnated with an insulative plastic, is arranged around a capacitor with opposing edges of the material bonded together by the plastic to provide a margin, and the leads of the capacitor are extended through the margin between opposing edges of the fibrous material.

Background of the invention

The present invention relates to an encapsulated capacitor and more particularly to a capacitor encapsulated within reinforced fibrous layers.

In capacitor manufacturing, it is often desirable that a substantially rigid, virtually impregnable protective seal be provided around the electrical component. In the prior art, many different arrangements and materials, including plastics, have been employed for this use. However, these generally require relatively thick molded coatings, which result in increased component size and weight, and require costly encapsulating techniques.

Summary of the invention

An encapsulated capacitor provided in accordance with the invention includes a layer of fibrous material which is impregnated with an insulative plastic and is disposed around a capacitor. Opposing edges of the layer are bonded together by the plastic to provide a margin, and leads of the component are extended through the margin between opposing layers. This provides a thin, light weight economical coating of high mechanical strength which provides electrical insulation and environmental protection for the component, and supports and reinforces the lead wires where they extend from the package.

In the preferred embodiment, the capacitor is sandwiched between opposing layers of the impregnated fibrous material, which extend beyond the component perimeter. The layers are bonded together at their edges, and a non-porous outer film is bonded over the fibrous layers to provide added protection against moisture penetration and a surface suitable for printing, and the like.

It is an object of this invention to provide an economical encapsulated capacitor.

It is another object of this invention to provide a capacitor having a thin, light weight coating which provides electrical insulation and environmental protection.

It is a further object of this invention to provide an encapsulated capacitor having a coating of high abrasion resistance and mechanical strength.

It is a still further object of this invention to provide an encapsulated capacitor having protective margins at the edges and corners of the component which support and reinforce the lead wires where they extend from the package.

These and other objects of the invention will be apparent from a consideration of the following description, the illustrated embodiments and the appended claims.

Description of the preferred embodiment

Figure 1:
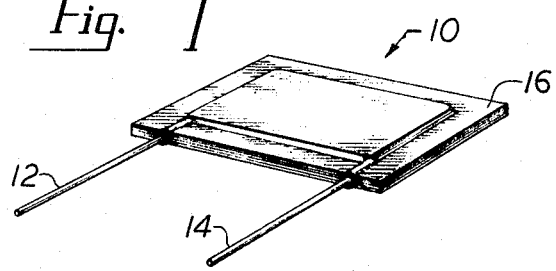
FIGURE 1 is a view in perspective of an encapsulated capacitor.

In FIGURE 1, an encapsulated capacitor 10 is shown having leads 12 and 14 extended through a sealed margin 16, which encompasses the perimeter of the enclosed component.

Figure 2:
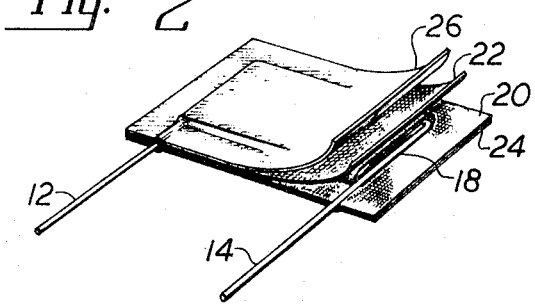
FIGURE 2 is a view in perspective of the capacitor of FIGURE 1 with the upper layers curled back to illustrate the laminated construction.

As illustrated in FIGURE 2, a capacitor 18 is sandwiched between two inner layers 20 and 22 of fibrous material, such as woven, spun, or matted fibers of glass, asbestos, cellulose, organic polymers or the like, and two outer layers 24 and 26 of non-porous material, such as a film of thermoplastic material, or the like. For example, an organic polymer such as polypropylene, polyethylene, polyamide, etc. is suitable for the outer film.

All the layers 20, 22, 24, and 26 exceed the perimeter of the component, as shown, and the inner layers 20, 22 are reinforced and impregnated with an insulative plastic such as an epoxy, polyester, polyamide, phenol-formaldehyde, or the like. The plastic impregnant provides a composite inner layer, and seals and bonds the inner layers to the outer, as well as all the layers together at margin 16.

In the preferred embodiment, the encapsulation includes a fiberglass inner layer impregnated with a thermosetting epoxy resin and an outer layer of polyethyleneterephthalate. This arrangement combines the high tensile strength of the fiberglass with the moisture barrier formed by the resin and the outer plastic film. In addition, the outer film provides a smooth external surface conducive to the printing of identifying indicia and the like.

The thermosetting resin is applied to the fabric layer in the wet, or A stage, that is readily soluble and fusible and then advanced to the B stage, (insoluble but plastic and fusible) before application of the layers to the component. The B stage, is, of course, preferred since the partially cured condition permits very rapid heat sealing while its tackiness holds the component and outer films in alignment during the process.

The unit is constructed by disposing an inner layer of the impregnated fiber and an outer layer of thermoplastic film on opposing surfaces of component 18. The layers, in each case, extend beyond the perimeter of the capacitor, as shown. Thereafter, by the application of heat and pressure to the sandwich arrangement, the layers are sealed together. A temperature of 150 to 350 degrees F. and a pressure of 100 to 300 p.s.i. is suitable, depending upon the bonding resin.

Generally, the layers need not be bonded over the full component surface, since margin 16 will provide an effective enclosure. However, for high strength, additional bonding may be accomplished by subjecting the entire surface to the indicated heat and pressure. For example, a rubber press can be utilized to conform to the general contour of the component.

Many types of capacitors, such as wound or stacked capacitors or the like, may be encapsulated in this manner, and although the novel construction is ideally suited for substantially flat components, it may be employed for units of many different shapes and sizes. In each case, the structure provides an economical encapsulation with a thin (only 5 mils thick per side), light weight coating, and provides excellent reinforcement of the extended lead wires. In regard to the latter, a lead margin of approximately $\frac{1}{16}$ inch is suitable. However, this margin may be extended if additional lead support is desired.

Many variations of the laminate arrangement can be employed. The impregnating material can be either thermoplastic or thermosetting. Hence, the impregnant material may be similar or identical to the outer film. For example, the preferred dual layer arrangement may utilize a thermoplastic impregnating material whose softening temperature is lower than that of either layer.

A satisfactory encapsulation may also be achieved without separate outer layers 24 and 26. In this case, only the impregnated fibrous layers are applied to the component. An outer glossy finish can still be achieved, however, by employing a moldlike press during sealing or by the use of a temporary outer film which is removed after sealing the unit.

Where the impregnating material is a thermoplastic, a comparatively glossy finish may be inherently provided. Furthermore, in some cases, the outer layers and the impregnation of the inner layers may be formed simultaneously during the sealing operation by transfer or injection molding of a polyester or polycarbonate or the like, which permeates the fibrous material and bonds the margins together, while also providing an outer film of moisture resistant plastic.

Advantageously, a plurality of components may be jointly enclosed, in accordance with the invention, so as to provide component groups or circuit sections. Thus, several components, interconnected or not as desired, may be sandwiched between planar layers, and sealed in the indicated manner. In this multi-component structure, the sealing margins could be provided around each individual component or around clusters of them.

Figure 3:
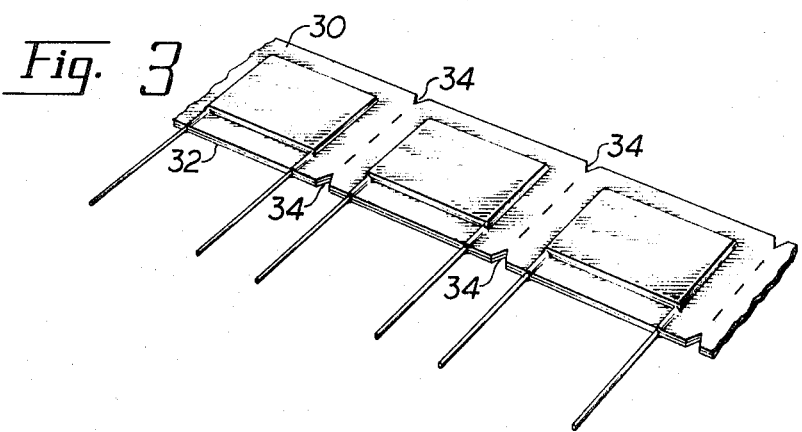
FIGURE 3 is a view in perspective of a plurality of encapsulated capacitors in strip form.

Furthermore, as shown in FIGURE 3, individual components may be rapidly encapsulated between strips 30 of the indicated layers. In this arrangement, one edge 32 of strips 30 provides a precut margin for the leads. Of course, this technique may also be applied to components having leads extended from opposing edges of the component, in which case, both transverse edges of the strip will provide the lead margins. However, components having leads extended from adjacent edges will generally require some pre-cutting of the strip.

The embodiment shown in FIGURE 3 is constructed in an automated process by feeding two impregnated strips, each having an overlying strip of non-porous film, to a component station. A component is then inserted between the fibrous layers with its leads extended from the strip. Thereafter, the layers are bonded together around the perimeter of the component by application of heat and pressure to a marginal perimeter.

Individual units may then be removed from the strip at any convenient time. Hence, the components may be stored, or shipped, in strip form. For convenience, the strip may be partly cut, or scored between components to facilitate their later removal. For example, opposing notches 34 may be provided between component margins.

Figure 4:
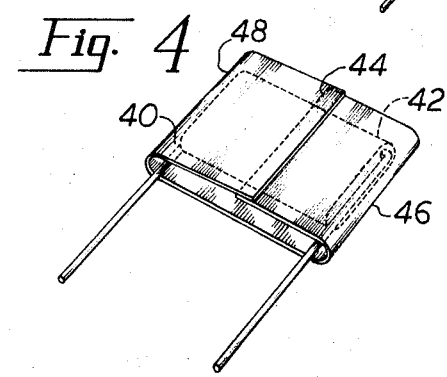
FIGURE 4 is a view in perspective of a further embodiment of the invention.

Many other arrangements are also possible. For example, a layer may be folded around the component, as shown in FIGURE 4. In this figure, layer 40 is folded around opposing ends of a component 42 and overlapped at its center as shown at 44. The unit is then sealed, in a manner similar to that previously described, with an additional seal along the overlapped seam. Of course, the folded edges 46 and 48 need not be marginated in this case, unless added protection is desired at this point.

In an alternative arrangement, not shown, the fold may be disposed at the component edge which is opposite to the lead extended edge. This construction would require margins along at least three edges, but would eliminate seam 44 since these edges now provide the lead margin.

Advantageously, the structure shown in FIGURE 4 could also be applied to components wherein leads extend in a plane other than the longitudinal plane of the component. For example, instead of an overlap seam at 44, these portions could be used to provide a lead margin in a plane substantially normal to component 42.

Thus, as many apparently widely different embodiments of the invention may be made without departing from the spirit and scope hereof, it should be understood that the invention is not to be limited except as defined in the appended claims.

What is claimed is:

1. An encapsulated capacitor comprising a capacitor having extended leads, at least one layer of fibrous material disposed around said capacitor, a portion of said fibrous material extending from said capacitor for providing a margin of opposed surfaces of said layer therebeyond, an insulative plastic impregnating said fibrous material and bonding said opposed surfaces of said margin together to enclose said capacitor and provide a sealed margin therebeyond, an outer film of thermoplastic material disposed over said fibrous layer and bonded thereto by said impregnating material, and at least one of said leads extending through said sealed margin between said opposed surfaces and supported thereby.

2. A combination as claimed in claim 1 including a pair of said layers, and a plurality of said capacitors sandwiched therebetween in spaced relation with leads of each of said components extended through said margin between opposed surfaces of said layers.

3. A combination as claimed in claim 1 wherein said fibrous material exceeds the perimeter of said capacitor to thereby provide a margin around said perimeter.

4. A combination as claimed in claim 1 wherein said capacitor is a substantially flat unit having leads extended from its perimeter in a substantially parallel relationship to the major surfaces thereof, and said fibrous material includes upper and lower inner layers which exceed the perimeter of said capacitor and provide a margin around said perimeter, and said combination includes upper and lower outer layers of thermoplastic material which extend to the edge of said inner layers and are bonded thereto.

5. A combination as claimed in claim 4 wherein said fibrous material is a woven layer and said impregnating plastic is a thermosetting material.

6. A combination as claimed in claim 5 wherein said fibrous material is a glass fabric, said plastic is a thermosetting epoxy, and said outer layer is polyethyleneterephthalate.

References Cited

UNITED STATES PATENTS 1,497,449   6/1924   Kempton _____ 317—261

FOREIGN PATENTS 807,480   1/1959   Great Britain.

LEWIS H. MYERS, *Primary Examiner.*

ELLIOT GOLDBERG, *Assistant Examiner.*

U.S. Cl. X.R.

29—25.42; 174—50; 317—242, 261